United States Patent
Wang et al.

(10) Patent No.: US 12,477,177 B2
(45) Date of Patent: Nov. 18, 2025

(54) VIDEO PROCESSING METHOD AND APPARATUS, AND DEVICE AND STORAGE MEDIUM

(71) Applicant: Beijing Zitiao Network Technology Co., Ltd., Haidian (CN)

(72) Inventors: Sen Wang, Beijing (CN); Junpeng Xiao, Beijing (CN); Weilin Guan, Beijing (CN); Shuai Han, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/569,973

(22) PCT Filed: Aug. 9, 2022

(86) PCT No.: PCT/CN2022/111116
§ 371 (c)(1),
(2) Date: Dec. 13, 2023

(87) PCT Pub. No.: WO2023/020332
PCT Pub. Date: Feb. 23, 2023

(65) Prior Publication Data
US 2024/0292056 A1    Aug. 29, 2024

(30) Foreign Application Priority Data

Aug. 18, 2021 (CN) .......................... 202110948040.9

(51) Int. Cl.
*H04N 21/442*        (2011.01)
(52) U.S. Cl.
CPC ..................... *H04N 21/44204* (2013.01)

(58) Field of Classification Search
None
See application file for complete search history.

(56) References Cited

U.S. PATENT DOCUMENTS

| | | | | |
|---|---|---|---|---|
| 4,809,325 A | * | 2/1989 | Hayashi | H04N 7/1675 725/31 |
| 10,616,162 B1 | * | 4/2020 | Zhao | H04L 51/18 |

(Continued)

FOREIGN PATENT DOCUMENTS

| CN | 102595196 A | 7/2012 |
|---|---|---|
| CN | 104239053 A | 12/2014 |

(Continued)

OTHER PUBLICATIONS

Extended European Search Report for European Patent Application No. 22857644.3, mailed on Nov. 27, 2024, 9 pages.

(Continued)

*Primary Examiner* — William J Kim
(74) *Attorney, Agent, or Firm* — Astute IP Law Group (57) ABSTRACT

The present disclosure provides a video processing method, apparatus, and device, and a storage medium, and the method includes: in a case where it is determined that a type of a target video belongs to a preset video type, recording a first timestamp when a play method call event for the target video is monitored, the preset video type being a video type that indicates only supporting playing once for each user; recording a second timestamp when a stop callback event corresponding to the play method call event is monitored; calculating a time difference between the second timestamp and the first timestamp and determining whether the time difference is smaller than a preset time threshold; and continuing to play the target video when the time difference is determined to be smaller than the preset time threshold.

19 Claims, 3 Drawing Sheets

(56) References Cited

U.S. PATENT DOCUMENTS

| | | | |
|---|---|---|---|
| 2001/0051037 A1* | 12/2001 | Safadi | H04N 21/42203 |
| | | | 348/E5.103 |
| 2003/0124973 A1 | 7/2003 | Sie et al. | |
| 2006/0136340 A1 | 6/2006 | Park | |
| 2010/0086277 A1* | 4/2010 | Craner | H04N 21/4424 |
| | | | 386/278 |
| 2012/0159528 A1* | 6/2012 | Toney, Jr. | H04H 60/33 |
| | | | 725/14 |
| 2013/0004142 A1 | 1/2013 | Grab et al. | |
| 2013/0091514 A1* | 4/2013 | Ishii | H04N 21/4667 |
| | | | 725/5 |
| 2013/0305273 A1* | 11/2013 | Hadfield | G06Q 30/0246 |
| | | | 725/14 |
| 2015/0350746 A1* | 12/2015 | Tomita | H04N 21/4436 |
| | | | 725/34 |
| 2016/0066002 A1* | 3/2016 | Dachiraju | G06Q 20/123 |
| | | | 725/2 |
| 2016/0149956 A1 | 5/2016 | Birnbaum et al. | |
| 2017/0064393 A1* | 3/2017 | Carlson | H04N 21/40 |
| 2017/0163703 A1 | 6/2017 | Cui et al. | |
| 2017/0262139 A1* | 9/2017 | Patel | H04L 51/046 |
| 2018/0007155 A1* | 1/2018 | Saito | H04L 67/535 |
| 2018/0124300 A1* | 5/2018 | Brook | H04N 23/62 |
| 2019/0141398 A1* | 5/2019 | Auxer | H04N 21/472 |
| 2020/0412864 A1* | 12/2020 | Al Majid | G06F 3/0488 |

FOREIGN PATENT DOCUMENTS

| | | | | |
|---|---|---|---|---|
| CN | 105208532 A | 12/2015 | | |
| CN | 106210079 A | 12/2016 | | |
| CN | 106791934 A | 5/2017 | | |
| CN | 107071522 A | 8/2017 | | |
| CN | 107801055 A | 3/2018 | | |
| CN | 111526385 A | 8/2020 | | |
| CN | 115708358 B | 5/2025 | | |
| JP | 2020191676 A | 11/2020 | | |
| WO | WO-2015184230 A2 * | 12/2015 | | G06Q 10/02 |

OTHER PUBLICATIONS

International Search Report and Written Opinion for International Application No. PCT/CN2022/111116, mailed on Oct. 28, 2022, 11 Pages.

Notice of Allowance for Chinese Patent Application No. 202110948040.9, mailed on Mar. 13, 2025, 6 pages.

Notice of Reasons for Refusal for Japanese Patent Application No. 2023-577419, mailed on Dec. 17, 2024, 12 Pages.

* cited by examiner

VIDEO PROCESSING METHOD AND APPARATUS, AND DEVICE AND STORAGE MEDIUM

CROSS-REFERENCE TO RELATED APPLICATION

This is a national stage application filed under 35 U.S.C. 371 based on International Patent Application No. PCT/CN2022/111116, filed Aug. 9, 2022, which claims priority to Chinese Patent Application No. 202110948040.9, filed on Aug. 18, 2021 and titled "video processing method, apparatus, and device, and storage medium", the disclosures of which are incorporated herein by reference in their entireties.

TECHNICAL FIELD

The present disclosure relates to the field of data processing, and in particular, to a video processing method, apparatus, and device, and a storage medium.

BACKGROUND

With the continuous development of the Internet short video technology, people have increasingly diversified requirements on video types, and a flashing video type has been emerged. As the name suggests, the flashing video type is a video type that indicates only supporting playing once for each user (except a video maker).

At present, due to an occasional problem at an underlying layer of a video player, it causes that when a user watches a video with the flashing type for the first time, the playing of the video ends immediately after starting, and a destroyed state of the flashing video is directly shown for the user, thereby seriously affecting the video viewing experience of the user.

SUMMARY

In order to solve or at least partially solve the above technical problems, the present disclosure provides a video processing method, which can solve the problem that the playing of the video of the flashing type ends immediately after starting caused by the above mentioned occasional problem at an underlying layer of a video player, thus improving the experience of the user when watching the video.

In a first aspect, the present disclosure provides a video processing method, and the method comprises:

if it is determined that a target video belongs to a preset video type, recording a first timestamp when a play method call event for the target video is monitored, the preset video type being a video type that indicates only supporting playing once for each user;

recording a second timestamp when a stop callback event corresponding to the play method call event is monitored;

calculating a time difference between the second timestamp and the first timestamp, and determining whether the time difference is smaller than a preset time threshold; and continuing to play the target video if the time difference is determined to be smaller than the preset time threshold.

In an alternative implementation, the method further comprises:

displaying a preset destroyed state of the target video if the time difference is determined not to be smaller than the preset time threshold.

In an alternative implementation, after the continuing to play the target video, the method further comprises:

displaying a preset destroyed state of the target video when a replay event for the target video is monitored.

In an alternative implementation, the method further comprises:

reporting a playing record of a current user for the target video to a server when the stop callback event corresponding to the play method call event is monitored, the playing record being used to update a played state of the target video for the current user at the server.

In an alternative implementation, the preset time threshold has a value in a range of 0.1 second to 0.2 second.

In an alternative implementation, before the if it is determined that a target video belongs to a preset video type, recording a first timestamp when a play method call event for the target video is monitored, the method further comprises:

determining whether the target video belongs to the preset video type when a play trigger operation on the target video is detected.

In a second aspect, the present disclosure provides a video processing apparatus, and the apparatus comprises:

a first recording module, configured to record a first timestamp when it is determined that a target video belongs to a preset video type and a play method call event for the target video is monitored, the preset video type being a video type that indicates only supporting playing once for each user;

a second recording module, configured to record a second timestamp when a stop callback event corresponding to the play method call event is monitored;

a calculation module, configured to calculate a time difference between the second timestamp and the first timestamp and determine whether the time difference is smaller than a preset time threshold; and a continuing playing module, configured to continue to play the target video when the time difference is determined to be smaller than the preset time threshold.

In a third aspect, the present disclosure provides a computer-readable storage medium, the computer-readable storage medium stores instructions, when the instructions are run on a terminal device, the terminal device is caused to implement the above-mentioned method.

In a fourth aspect, the present disclosure provides a device, comprising a memory, a processor, and a computer program stored on the memory and executable on the processor, the processor is configured to, when executing the computer program, implement the above-mentioned method.

In a fifth aspect, the present disclosure provides a computer program product, the computer program product comprises a computer program/instruction, and when the computer program/instruction is executed by a processor, the method is implemented.

Compared with the prior art, the technical solution provided by the embodiments of the present disclosure has the following advantages:

the present disclosure provides a video processing method, when it is determined that the target video belongs to a flashing type video, a play method call event for the target video is monitored, and when the play method call event for the target video has been monitored, the first timestamp is recorded. Then, when a stop callback event corresponding to the play method call event has been monitored, a second timestamp is recorded, the time difference between the second timestamp and the first timestamp is calculated, and it is determined whether the time difference is smaller than a preset time threshold. Furthermore, when it is determined that the time difference is smaller than the preset time threshold, the target video continues to be played without responding to the stop callback event. The embodiments of the present disclosure identify the occasional problem at the underlying layer of the video player by recording the time difference between the stop callback event and the play method call event for the target video, and avoids the phenomenon that the playing of the video of the flashing type ends as soon as it starts due to the occasional problem by a processing method of not responding to the stop callback event in the occasional problem and continuing to play the target video, thus improving the experience of the user when watching the video.

BRIEF DESCRIPTION OF THE DRAWINGS

The accompanying drawings herein are incorporated into and constitute a part of the specification, show the embodiments consistent with the present disclosure, and together with the description, serve to explain the principles of the present disclosure.

In order to more clearly illustrate the technical solutions of the embodiments of the present disclosure or the prior art, the drawings required for describing the embodiments or the prior art will be briefly described in the following; it is obvious that those skilled in the art can obtain other drawing (s) according to these drawings, without any inventive work.

DETAILED DESCRIPTION

In order to understand the above objects, features, and advantages of the present disclosure more clearly, the technical solutions of the present disclosure will be further described below. It should be noted that, in case of no conflict, the embodiments of the present disclosure and the features in the embodiments can be combined with each other.

In the following description, many specific details are set forth in order to fully understand the present disclosure, but the present disclosure may be implemented in other ways than those described herein; apparently, the embodiments in the specification are just a part but not all of the embodiments of the present disclosure.

An occasional problem at an underlying layer of a video player mentioned in the present disclosure refers to that the video player will return a stop callback event immediately after calling a play method. The occasional problem especially occurs in the IOS system.

Because some processing logics in a video of a flashing type are implemented based on the stop callback event, for example, during the process of playing of the video of the flashing type, once the stop callback event has been monitored, the playing of the video is ended, and a destroyed state of the video is directly displayed. Therefore, the above-described occasional problem at the underlying layer of the video player will cause that when a user watches the video of the flashing type for the first time, the playing of the video may be stopped immediately after starting, and the destroyed state is directly shown for the user, thus seriously affecting the viewing experience of the user.

For this purpose, an embodiment of the present disclosure provides a video processing method. Specifically, when it is determined that the target video belongs to a flashing type video, a play method call event for the target video is monitored, and when the play method call event for the target video has been monitored, the first timestamp is recorded. Then, when a stop callback event corresponding to the play method call event has been monitored, a second timestamp is recorded, the time difference between the second timestamp and the first timestamp is calculated, and it is determined whether the time difference is smaller than a preset time threshold. Furthermore, when it is determined that the time difference is smaller than the preset time threshold, the target video continues to be played without responding to the stop callback event.

Thus it can be seen that the embodiments of the present disclosure identify the above-mentioned occasional problem at the underlying layer of the video player by recording the time difference between the stop callback event and the play method call event for the target video, and avoids the phenomenon that the playing of the video of the flashing type is stopped immediately after starting due to the occasional problem by a processing method of not responding to the stop callback event in the occasional problem and continuing to play the target video, thereby improving the experience of the user when watching the video.

Figure 1:
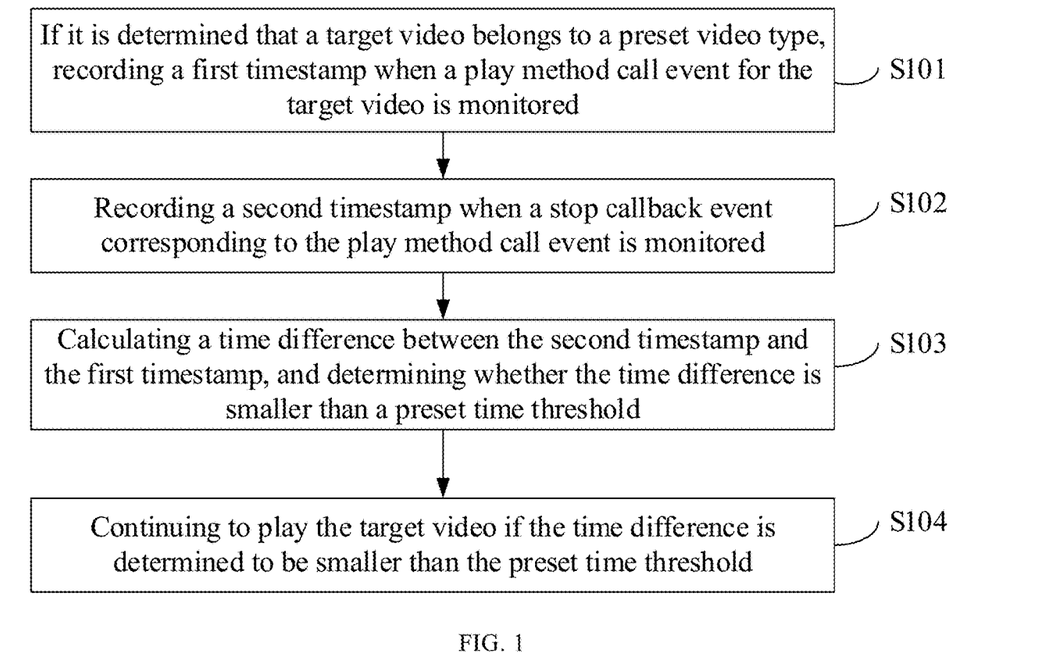
FIG. 1 is a flowchart of a video processing method provided in an embodiment of the present disclosure.

On this basis, an embodiment of the present disclosure provides a video processing method. With reference to FIG. 1, which is a flowchart of a video processing method provided in an embodiment of the present disclosure, the video processing method includes the following steps.

S101: if it is determined that a target video belongs to a preset video type, recording a first timestamp when a play method call event for the target video is monitored.

The preset video type is a video type that indicates only supporting playing once for each user.

In an embodiment of the present disclosure, the play method call event refers to an event of triggering the target video to start being played by calling a play method. Specifically, monitoring the play method call event for the target video may include monitoring a call event for the play method for the target video.

In practical application, when a play trigger operation on the target video is detected, firstly, whether the target video belongs to the preset video type is determined, where the preset video type may also be referred to as a flashing video type. Specifically, whether the target video belongs to the preset video type may be determined according to a video type identifier of the target video and the like.

If it is determined that the target video belongs to the flashing video type, the embodiment of the present disclosure may allow for monitoring the play method call event for the target video in order to avoid the experience of the user when watching the video from being affected by the above-mentioned occasional event at the underlying layer of the video player. Once the play method call event for the target video has been monitored, the first timestamp t1 is recorded and is used for subsequently identifying whether the above-mentioned occasional event at the underlying layer of the video player occurs.

For a video type with a processing logic independent of a stop callback event, the above-mentioned occasional event at the underlying layer of the video player may not be processed specially. Specifically, if it is determined that the target video does not belong to the flashing video type, the first timestamp when the play method call event for the target video occurs may not need to be recorded.

S102: recording a second timestamp when a stop callback event corresponding to the play method call event is monitored.

For a video playing logic, usually, the play method call event and the stop callback event appear in pair. When the play method call event for the target video has been monitored, it indicates that the target video starts being played, and at this time, monitoring the stop callback event for the target video may be started. Specifically, monitoring the stop callback event for the target video may include monitoring a call event for a stop method for the target video.

In an embodiment of the present disclosure, when the stop callback event corresponding to the play method call event for the target video has been monitored, the second timestamp t2 is recorded and is used for subsequently identifying whether the above-mentioned occasional event at the underlying layer of the video player occurs.

S103: calculating a time difference between the second timestamp and the first timestamp, and determining whether the time difference is smaller than a preset time threshold.

Because the underlying occasional problem that the video player returns the stop callback event immediately after calling the play method is characterized by a short time difference (which is usually a time difference on the order of tens of milliseconds) between calling the play method and returning the stop callback event. However, the time difference between calling the play method and returning the stop callback event during the process of playing the normal video is far greater than the time difference of tens of milliseconds. Based on the point of distinction, the inventors have conceived of identifying the above-mentioned occasional problem at the underlying layer of the video player by using the time difference between calling the play method and returning the stop callback event.

In an embodiment of the present disclosure, after the first timestamp t1 corresponding to the play method call event and the second timestamp t2 corresponding to the stop callback event are recorded, the time difference between the second timestamp t2 and the first timestamp t1 is calculated. Because the magnitude of the time difference can be used for identifying the above-mentioned occasional problem at the underlying layer of the video player, the embodiment of the present disclosure determines whether the time difference is smaller than the preset time threshold, so as to identify whether the above-mentioned occasional problem at the underlying layer of the video player occurs currently.

It needs to be noted that because the time difference between calling the play method and returning the stop callback event in the occasional problem at the underlying layer of the video player is usually on the order of tens of milliseconds, and the time difference between calling the play method and returning the stop callback event during the process of playing the normal video is far greater than the time difference of tens of milliseconds. For this purpose, the preset time threshold may be predetermined to be any numerical value in a range of 0.1 second to 0.2 second in the embodiment of the present disclosure, for example, the preset time threshold is 0.2 second so as to identify whether the above-mentioned occasional problem at the underlying layer of the video player occurs currently.

S104: continuing to play the target video if the time difference is determined to be smaller than the preset time threshold.

In an embodiment of the present disclosure, after the time difference between the first timestamp t1 corresponding to the play method call event for the target video and the second timestamp t2 corresponding to the stop callback event for the target video is calculated, it is determined whether the time difference is smaller than the preset time threshold to identify whether the above-mentioned occasional problem at the underlying layer of the video player occurs currently.

If the time difference is determined to be smaller than the preset time threshold, it indicates that the above-mentioned occasional problem at the underlying layer of the video player occurs currently, and in this case, the playing of the target video is continued without responding to the stop callback event monitored currently. Thus, the experience of the user when watching the video is avoided from being affected due to the above-mentioned occasional problem at the underlying layer of the video player.

In an alternative implementation, if it is determined that the time difference is not smaller than the preset time difference, it can be considered that the stop callback event monitored currently does not belong to the above-mentioned occasional problem at the underlying layer of the video player. For this purpose, the embodiment of the present disclosure may allow for processing based on the processing logic of the video of the flashing type.

In an alternative implementation, the stop callback event for the target video may also be monitored when the playing of the target video is completed, at this time, if it is determined that the time difference between the first timestamp t1 corresponding to the play method call event for the target video and the second timestamp t2 corresponding to the stop callback event for the target video is not smaller than the preset time threshold, a preset destroyed state of the target video may be shown to prompt the user that the target video has finished playing and does not support playing again.

Figure 2:
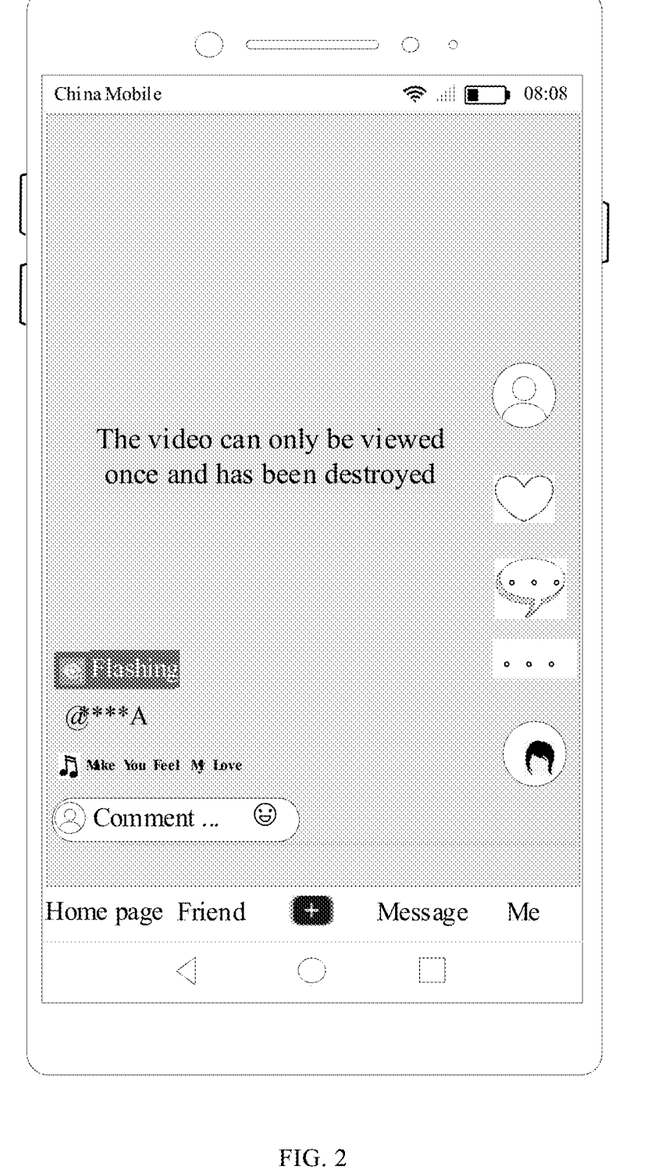
FIG. 2 is a schematic diagram of a preset destroyed state of a target video provided in an embodiment of the present disclosure.

As shown in FIG. 2, which is a schematic diagram of a preset destroyed state of a target video provided in an embodiment of the present disclosure, a mask layer is shown on a play page for the target video, and prompt information "the video can only be viewed once and has been destroyed" is displayed over the mask layer, which can prompt the user that the target video has finished playing and does not support playing again.

In the video processing method provided in the embodiment of the present disclosure, when it is determined that the target video belongs to a flashing type video, a play method call event for the target video is monitored, and when the play method call event for the target video has been monitored, the first timestamp is recorded. Then, when a stop callback event corresponding to the play method call event has been monitored, a second timestamp is recorded, the time difference between the second timestamp and the first timestamp is calculated, and it is determined whether the time difference is smaller than a preset time threshold. Furthermore, when it is determined that the time difference is smaller than the preset time threshold, the target video continues to be played without responding to the stop callback event. The embodiments of the present disclosure identify the above-mentioned occasional problem at the underlying layer of the video player by recording the time difference between the stop callback event and the play method call event for the target video, and avoids the phenomenon that the playing of the video of the flashing type is stopped immediately after starting due to the occasional problem by a processing method of not responding to the stop callback event in the occasional problem and continuing to play the target video, thereby improving the experience of the user when watching the video.

In practical application, in some video playing scenarios, a video may be automatically played again after its playing is terminated. Based on the characteristic that the flashing video type indicates only supporting playing once for each user in the embodiment of the present disclosure, when a replay event for a video of the flashing type has been monitored, the embodiment of the present disclosure may allow for directly showing the preset destroyed state of the video, thereby avoiding replaying the video.

Specifically, on the basis of the above embodiments, the embodiment of the present disclosure allows for monitoring the replay event for the target video after determining that the time difference between the first timestamp t1 corresponding to the play method call event for the target video and the second timestamp t2 corresponding to the stop callback event for the target video is smaller than the preset time threshold and continuing to play the target video.

If the replay event for the target video has been monitored, instead of responding to the replay event, the preset destroyed state of the target video is shown, so as to guarantee the user's experience of viewing the video of the flashing type.

In addition, in the embodiment of the present disclosure, if the stop callback event for the target video is monitored, it indicates that the target video is in a played state for the current user. To guarantee the user's experience of viewing the video of the flashing type, a client may report a playing record of a current user for the target video to a server, so that the server can update the played state of the target video for the current user based on the playing record, thereby guaranteeing that the destroyed state can be directly shown for the user when the current user triggers the playing of the target video next time. Thus, the playing effect of the video of the flashing type is guaranteed. Specifically, based on the content in the above embodiments, the client reports the playing record of the current user for the target video to the server upon monitoring the stop callback event corresponding to the play method call event for the target video, and the playing record is used for updating the played state of the target video for the current user on the server side.

Figure 3:
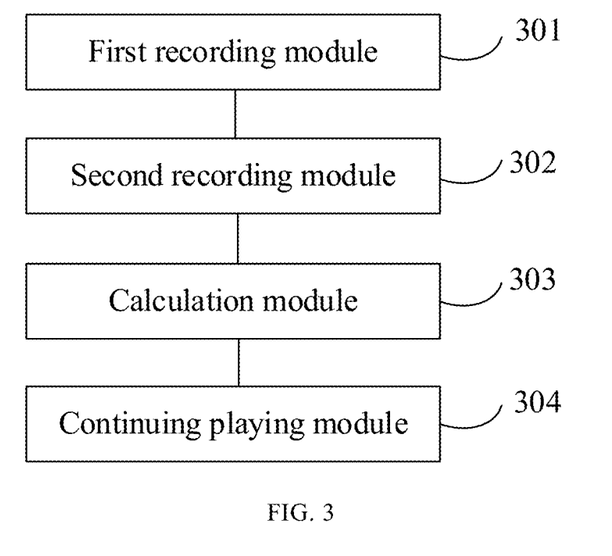
FIG. 3 is a structural schematic diagram of a video processing apparatus provided in an embodiment of the present disclosure.

Based on the same inventive concept as the above method embodiments, the present disclosure further provides a video processing apparatus. With reference to FIG. 3, which is a structural schematic diagram of a video processing apparatus provided in an embodiment of the present disclosure, the video processing apparatus includes:

a first recording module 301 configured to record a first timestamp when it is determined that a target video belongs to a preset video type and a play method call event for the target video is monitored, where the preset video type is a video type that indicates only supporting playing once for each user;

a second recording module 302 configured to record a second timestamp when a stop callback event corresponding to the play method call event is monitored;

a calculation module 303 configured to calculate a time difference between the second timestamp and the first timestamp and determine whether the time difference is smaller than a preset time threshold ; and a continuing playing module 304 configured to continue to play the target video when the time difference is determined to be smaller than the preset time threshold.

In an alternative implementation, the apparatus further comprises:

a first display module, configured to display a preset destroyed state of the target video when the time difference is determined not to be smaller than the preset time threshold.

In an alternative implementation, the apparatus further comprises:

a second display module, configured to display a preset destroyed state of the target video when a replay event for the target video is monitored.

In an alternative implementation, the apparatus further comprises:

a reporting module, configured to report a playing record of a current user for the target video to a server when the stop callback event corresponding to the play method call event is monitored, the playing record being used to update a played state of the target video for the current user at the server.

In an alternative implementation, the preset time threshold has a value in a range of 0.1 second to 0.2 second.

In an alternative implementation, the apparatus further comprises:

a determination module, configured to determine whether the target video belongs to the preset video type when a play trigger operation on the target video is detected.

In the video processing apparatus provided in the embodiment of the present disclosure, when it is determined that the target video belongs to a flashing type video, a play method call event for the target video is monitored, and when the play method call event for the target video has been monitored, the first timestamp is recorded. Then, when a stop callback event corresponding to the play method call event has been monitored, a second timestamp is recorded, the time difference between the second timestamp and the first timestamp is calculated, and it is determined whether the time difference is smaller than a preset time threshold. Furthermore, when it is determined that the time difference is smaller than the preset time threshold, the target video continues to be played without responding to the stop callback event. The embodiments of the present disclosure identify the above-mentioned occasional problem at the underlying layer of the video player by recording the time difference between the stop callback event and the play method call event for the target video, and avoids the phenomenon that the playing of the video of the flashing type is stopped immediately after starting due to the occasional problem by a processing method of not responding to the stop callback event in the occasional problem and continuing to play the target video, thereby improving the experience of the user when watching the video.

In addition to the above method and apparatus, the embodiments of the present disclosure further provide a computer-readable storage medium, the computer-readable storage medium stores instructions, when the instructions are run on a terminal device, the terminal device is caused to implement the video processing method described in the embodiment of the present disclosure.

The embodiments of the present disclosure further provide a computer program product, the computer program product comprises a computer program/instruction, and when the computer program/instruction is executed by a processor, the video processing method described in the embodiment of the present disclosure is implemented.

Figure 4:
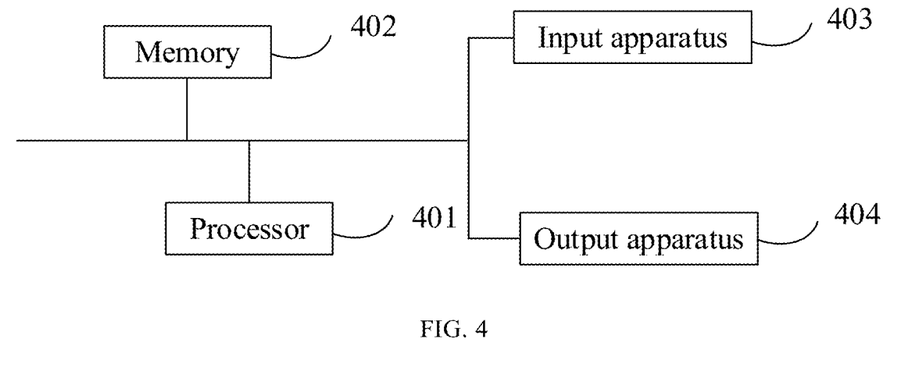
FIG. 4 is a structural schematic diagram of a video processing device provided in an embodiment of the present disclosure.

In addition, the embodiments of the present disclosure further provide a video processing device, referring to FIG. 4, the video processing device may comprise:

a processor 401, a memory 402, an input apparatus 403, and an output apparatus 404. The number of processors 401 in the video processing device can be one or more, and one processor is taken as an example in FIG. 4. In some embodiments of the present disclosure, the processor 401, the memory 402, the input apparatus 403, and the output apparatus 404 may be connected through a bus or other means, and the connection through a bus is taken as an example in FIG. 4.

The memory 402 may be used to store software programs and modules, and the processor 401 executes various functional applications and data processing of the video processing device by running the software programs and modules stored in the memory 402. The memory 402 may mainly include a storage program area and a storage data area, the storage program area may store an operating system, an application program required by at least one function, and the like. In addition, the memory 402 may include a high-speed random access memory, and may also include a non-volatile memory, such as at least one magnetic disk memory device, a flash memory device, or other volatile solid-state memory devices. The input apparatus 403 can be used to receive input numeric or character information and to generate signal input related to user settings and function control of the video processing device.

Specifically, in the embodiment, the processor 401 can load the executable files corresponding to the processes of one or more application programs into the memory 402 according to the following instructions, and the processor 401 can run the application programs stored in the memory 402, thus implementing various functions of the above video processing device.

It should be understood that in the specification, the relational terms such as "first", "second", etc. are only used for distinguishing one entity or operation from another entity or operation, and do not necessarily require or imply any such actual relationship or order between these entities or operations. Moreover, the term "comprise/include", "contain", and any variations thereof are intended to cover non-exclusive inclusion, such that a process, method, article, or device including a series of elements includes not only those elements, but also other elements not explicitly listed or elements inherent to such process, method, article, or device. Without further restrictions, an element defined by the phrase "comprising/including one" does not exclude the existence of other identical elements in the process, method, article, or device including the element.

What has been described above is only the specific implementation of the present disclosure, so that those skilled in the art can understand or implement the present disclosure. Various modifications to these embodiments will be apparent to those skilled in the art, and the general principles defined herein can be implemented in other embodiments without departing from the spirit or scope of the present disclosure. Therefore, the present disclosure will not be limited to the embodiments described herein, but is to be accorded the widest scope consistent with the principles and novel features disclosed herein.

The invention claimed is:

1. A video processing method, comprising:

in response to a type of a target video belonging to a preset video type, recording a first timestamp when a play method call event for the target video is monitored, wherein the preset video type is a video type that indicates only supporting playing once for each user, and the first timestamp is configured to identify whether an occasional event at an underlying layer of a video player occurs;

recording a second timestamp when a stop callback event corresponding to the play method call event is monitored, wherein the second timestamp is configured to identify whether the occasional event at the underlying layer of the video player occurs;

calculating a time difference between the second timestamp and the first timestamp; and ignoring the stop callback event and continuing to play the target video when the time difference is smaller than a preset time threshold to determine that the occasional event at the underlying layer of the video player occurs currently.

2. The method according to claim 1, further comprising:

displaying a preset destroyed state of the target video when the time difference is not smaller than the preset time threshold.

3. The method according to claim 2, wherein after the continuing to play the target video, the method further comprises:

displaying a preset destroyed state of the target video when a replay event for the target video is monitored.

4. The method according to claim 2, further comprising:

reporting a playing record of a current user playing the target video to a server when the stop callback event corresponding to the play method call event is monitored, wherein the playing record is used to update a played state of the target video for the current user at the server.

5. The method according to claim 2, wherein before the recording the first timestamp when the play method call event for the target video is monitored, the method further comprises:

determining whether the type of the target video belongs to the preset video type when a play trigger operation on the target video is detected.

6. The method according to claim 1, wherein after the continuing to play the target video, the method further comprises:

displaying a preset destroyed state of the target video when a replay event for the target video is monitored.

7. The method according to claim 6, further comprising:

reporting a playing record of a current user playing the target video to a server when the stop callback event corresponding to the play method call event is monitored, wherein the playing record is used to update a played state of the target video for the current user at the server.

8. The method according to claim 6, wherein before the recording the first timestamp when the play method call event for the target video is monitored, the method further comprises:

determining whether the type of the target video belongs to the preset video type when a play trigger operation on the target video is detected.

9. The method according to claim 1, further comprising:

reporting a playing record of a current user playing the target video to a server when the stop callback event corresponding to the play method call event is monitored, wherein the playing record is used to update a played state of the target video for the current user at the server.

10. The method according to claim 9, wherein before the recording the first timestamp when the play method call event for the target video is monitored, the method further comprises:

determining whether the type of the target video belongs to the preset video type when a play trigger operation on the target video is detected.

11. The method according to claim 1, wherein the preset time threshold has a value in a range of 0.1 second to 0.2 second.

12. The method according to claim 1, wherein before the recording the first timestamp when the play method call event for the target video is monitored, the method further comprises:

determining whether the type of the target video belongs to the preset video type when a play trigger operation on the target video is detected.

13. A non-transitory computer-readable storage medium, wherein the non-transitory computer-readable storage medium stores instructions, when the instructions are run on a terminal device, the terminal device is caused to implement a method, which comprises:

in response to a type of a target video belonging to a preset video type, recording a first timestamp when a play method call event for the target video is monitored, wherein the preset video type is a video type that indicates only supporting playing once for each user, and the first timestamp is configured to identify whether an occasional event at an underlying layer of a video player occurs;

recording a second timestamp when a stop callback event corresponding to the play method call event is monitored, wherein the second timestamp is configured to identify whether the occasional event at the underlying layer of the video player occurs;

calculating a time difference between the second timestamp and the first timestamp; and ignoring the stop callback event and continuing to play the target video when the time difference is smaller than a preset time threshold to determine that the occasional event at the underlying layer of the video player occurs currently.

14. A device, comprising a memory, a processor, and a computer program stored on the memory and executable on the processor, wherein the processor is configured to, when executing the computer program, implement a method, which comprises:

in response to a type of a target video belonging to a preset video type, recording a first timestamp when a play method call event for the target video is monitored, wherein the preset video type is a video type that indicates only supporting playing once for each user, and the first timestamp is configured to identify whether an occasional event at an underlying layer of a video player occurs;

recording a second timestamp when a stop callback event corresponding to the play method call event is monitored, wherein the second timestamp is configured to identify whether the occasional event at the underlying layer of the video player occurs;

calculating a time difference between the second timestamp and the first timestamp; and ignoring the stop callback event and continuing to play the target video when the time difference is smaller than a preset time threshold to determine that the occasional event at the underlying layer of the video player occurs currently.

15. The device according to claim 14, wherein the method further comprises:

displaying a preset destroyed state of the target video when the time difference is not smaller than the preset time threshold.

16. The device according to claim 14, wherein after the continuing to play the target video, the method further comprises:

displaying a preset destroyed state of the target video when a replay event for the target video is monitored.

17. The device according to claim 14, wherein the method further comprises:

reporting a playing record of a current user playing the target video to a server when the stop callback event corresponding to the play method call event is monitored, wherein the playing record is used to update a played state of the target video for the current user at the server.

18. The device according to claim 14, wherein the preset time threshold has a value in a range of 0.1 second to 0.2 second.

19. The device according to claim 14, wherein before the recording the first timestamp when the play method call event for the target video is monitored, the method further comprises:

determining whether the type of the target video belongs to the preset video type when a play trigger operation on the target video is detected.

* * * * *